(12) United States Patent
Grzeskowiak, II et al.

(10) Patent No.: US 9,289,923 B1
(45) Date of Patent: Mar. 22, 2016

(54) SYNTHETIC MOLDED SLABS, AND SYSTEMS AND METHODS RELATED THERETO

(71) Applicant: Cambria Company LLC, Eden Prairie, MN (US)

(72) Inventors: Jon Louis Grzeskowiak, II, Prior Lake, MN (US); Martin E. Davis, Excelsior, MN (US)

(73) Assignee: Cambria Company LLC, Eden Prairie, MN (US)

( * ) Notice: Subject to any disclaimer, the term of this patent is extended or adjusted under 35 U.S.C. 154(b) by 0 days.

(21) Appl. No.: 14/610,172

(22) Filed: Jan. 30, 2015

(51) Int. Cl.
| | |
|---|---|
| *B32B 3/10* | (2006.01) |
| *B29C 39/12* | (2006.01) |
| *B44F 9/04* | (2006.01) |
| *C04B 14/06* | (2006.01) |
| *C04B 26/02* | (2006.01) |
| *B29L 31/10* | (2006.01) |
| *B29L 7/00* | (2006.01) |

(52) U.S. Cl.
CPC . *B29C 39/12* (2013.01); *B44F 9/04* (2013.01); *C04B 14/06* (2013.01); *C04B 26/02* (2013.01); *B29L 2007/00* (2013.01); *B29L 2031/10* (2013.01)

(58) Field of Classification Search
CPC .............................. B29D 99/0039; B44F 9/04
See application file for complete search history.

(56) References Cited

U.S. PATENT DOCUMENTS

| | | |
|---|---|---|
| 178,308 A | 6/1876 | Leather et al. |
| 1,212,331 A | 1/1917 | Denivelle |
| 1,474,817 A | 11/1923 | Fincke |
| 1,485,810 A | 3/1924 | Parker, Jr. et al. |
| 1,570,538 A | 1/1926 | Thomas |
| 1,711,701 A | 5/1929 | Speck |
| 2,280,488 A | 4/1942 | Jenkins et al. |
| 3,013,370 A | 12/1961 | Vida |
| 3,164,647 A | 1/1965 | Fischler |
| 3,177,279 A | 4/1965 | Bilodeau |
| 3,245,129 A | 4/1966 | Entz |
| 3,245,648 A | 4/1966 | Johansson et al. |
| 3,628,766 A | 12/1971 | Hartmann |
| 3,670,060 A | 6/1972 | Cuffaro et al. |
| 3,712,825 A | 1/1973 | Yocum |
| 3,743,235 A | 7/1973 | Shelley |
| 3,819,436 A | 6/1974 | Allen |
| 3,843,089 A | 10/1974 | Scholz et al. |
| 3,904,791 A | 9/1975 | Iverson et al. |
| 4,094,941 A | 6/1978 | Manners et al. |
| 4,254,077 A | 3/1981 | Fontana et al. |

(Continued)

FOREIGN PATENT DOCUMENTS

| | | |
|---|---|---|
| CN | 102050598 A | 5/2011 |
| WO | WO2007080059 A1 | 7/2007 |

(Continued)

OTHER PUBLICATIONS

"Cambria introduces the new costal collection," [press release] Feb. 4, 2014, 2 pages.

*Primary Examiner* — David Sample
*Assistant Examiner* — Christopher Polley
(74) *Attorney, Agent, or Firm* — Fish & Richardson P.C.

(57) ABSTRACT

This document describes systems and processes for forming synthetic molded slabs, which may be suitable for use in living or working spaces (e.g., along a countertop, table, floor, or the like).

16 Claims, 8 Drawing Sheets

(56) References Cited

U.S. PATENT DOCUMENTS

| | | |
|---|---|---|
| 4,680,155 A | 7/1987 | Rochefort et al. |
| 4,914,870 A | 4/1990 | Toncelli |
| 5,022,193 A | 6/1991 | Toncelli |
| 5,080,085 A | 1/1992 | Lovato |
| 5,662,847 A | 9/1997 | Uchida et al. |
| 5,670,007 A | 9/1997 | Toncelli |
| 5,679,298 A | 10/1997 | Uchida et al. |
| 5,813,183 A | 9/1998 | Attley |
| 6,205,727 B1 | 3/2001 | Toncelli |
| 6,237,294 B1 | 5/2001 | Rygiel |
| 6,461,552 B1 | 10/2002 | Geiger |
| 6,572,802 B1 | 6/2003 | Austin |
| 7,771,680 B2 | 8/2010 | Gordienko |
| 7,815,827 B2 | 10/2010 | Cruz |
| 8,030,441 B2 | 10/2011 | Toncelli |
| 8,101,113 B2 | 1/2012 | Castonguay et al. |
| 8,158,548 B2 | 4/2012 | Di Noto et al. |
| 8,333,916 B2 | 12/2012 | Jamrussamee et al. |
| 8,398,954 B2 | 3/2013 | Gordienko |
| 8,636,941 B1 | 1/2014 | Ciuperca |
| 9,186,819 B1 | 11/2015 | Grzeskowiak |
| 2004/0032044 A1 | 2/2004 | Toncelli |
| 2005/0013991 A1 | 1/2005 | Yang |
| 2008/0113123 A1 | 5/2008 | Izzo |
| 2010/0159220 A1 | 6/2010 | Toncelli |
| 2010/0194005 A1* | 8/2010 | Toncelli ............. B28B 1/005 264/650 |
| 2011/0034586 A1* | 2/2011 | Buskila ............. B28B 1/004 523/216 |
| 2011/0283859 A1 | 11/2011 | Codemo |
| 2012/0183735 A1 | 7/2012 | Moreno |
| 2013/0130036 A1 | 5/2013 | Bettiol |
| 2013/0196251 A1 | 8/2013 | Di Noto et al. |

FOREIGN PATENT DOCUMENTS

| | | |
|---|---|---|
| WO | WO2008015596 | 2/2008 |
| WO | WO2009010406 | 1/2009 |

* cited by examiner

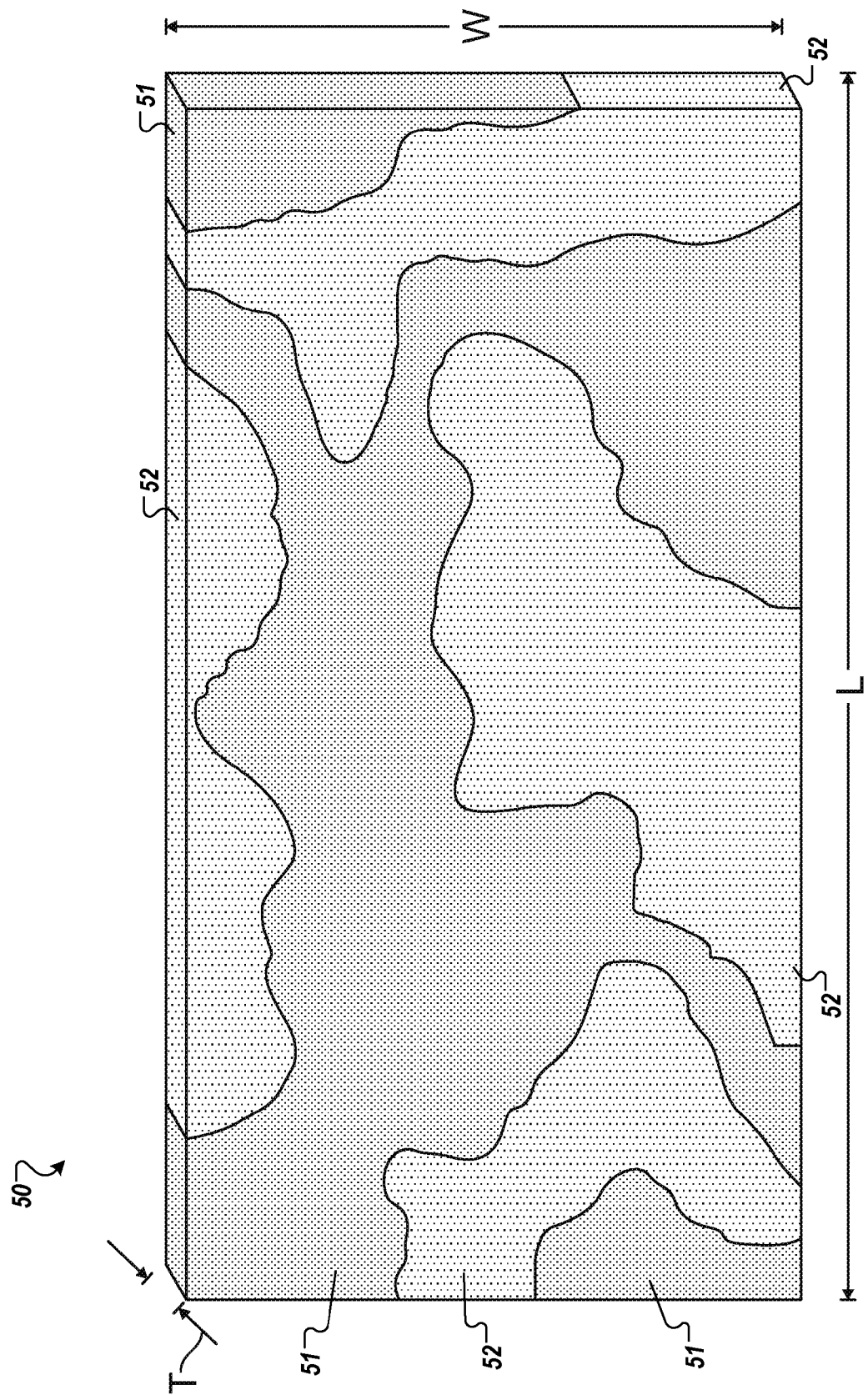

US 9,289,923 B1

SYNTHETIC MOLDED SLABS, AND SYSTEMS AND METHODS RELATED THERETO

TECHNICAL FIELD

This document describes systems and processes for forming synthetic mold slab products, for example, a synthetic mold slab that is thermoformed or otherwise compacted to a selected slab shape from a mixture including particulate mineral material, resin binder, and pigments so that the synthetic molded slab is suitable for use in living or working spaces (e.g., along a countertop, table, floor, or the like).

BACKGROUND

Quarried stone slabs are a commonly used building material. Granite, marble, soapstone, and other quarried stones are often selected for use as countertops due to their aesthetic properties. Despite the visual appeal of quarried stone, quarried stones can be quite expensive to obtain and are generally limited to naturally occurring color schemes.

Engineered stone slabs may be formed from a man-made combination of materials that can provide improved stain-resistant or heat-resistant properties compared to quarried stone. Engineered stone is typically a combination of particulate mineral material and binder, such as a polymer resin or cement. Some engineered stones partly emulate some aesthetic properties of quarried stone, but still fall noticeably short of the complicated look and texture of quarried stone.

SUMMARY

Some embodiments described herein include systems and processes for forming synthetic molded slabs suitable for use in living or working spaces (e.g., along a countertop, table, floor, or the like). In particular embodiments, the synthetic molded slabs can be manufactured using, for example, a set of stencils that separate differently pigmented particulate mineral mixes into predetermined regions of a series of molds, thereby providing molded slabs having a similar appearance to one another (which, unlike quarried stone slabs taken from a quarry, can be generally repeatable and predefined as part of the manufacturing process). As used herein, "differently pigmented" means having different pigment combinations or otherwise having a different visual apparent in color tone or visual texture. In such embodiments, however, the appearance of each synthetic molded slab can provide the complex striations and veining patterns that emulate a quarried stone slab. For example, each slab can be formed from a combination of differently pigmented particulate mineral mixes that are separately dispensed into two or more partial molds which combine to facilitate the selected striations and veining patterns. The slabs may be subsequently processed by compression molding and curing operations.

Particular embodiments described herein include a process of forming a synthetic molded slab from different particulate mineral mixes. The process may include sequentially dispensing at least first and second pigmented particulate mineral mixes comprising predominantly a quartz material into a single slab mold using at least first and second distributors. The first distributor may output the first pigmented particulate mineral mix through a first stencil positioned over the slab mold and into the slab mold according to a first stencil pattern, and the second distributor may subsequently output the second pigmented particulate mineral mix through a second stencil positioned over the slab mold and into the slab mold according to a second stencil pattern such that the second pigmented particulate mineral mix is deposited in regions of the slab mold that are unoccupied by the first pigmented particulate mineral mix. The process may further include vibrating and/or compacting the pigmented particulate mineral mixes arranged in the slab mold so as to form a synthetic molded slab that is generally rectangular and has major surface. In various embodiments, the major surface may have a width or at least 3 feet and a length of at least 6 feet. Optionally, the aforementioned vibrating and compacting of the pigmented particulate mineral mixes arranged in the slab mold may be performed contemporaneously. Additional embodiments described herein include a synthetic molded slab formed according to this particular process.

Some embodiments described herein include a process of forming a synthetic molded slab from a set of different particulate mineral mixes that each include a quartz material, one or more pigments, and one or more resin binders. The process may include outputting a first particulate mineral mix of the set of different particulate mineral mixes from a first distributor and through a first stencil that is positioned over a slab mold and that defines a first pattern of first design apertures surrounded by first occluded regions. The process may further include depositing the first particulate mineral mix passing through the first design apertures into the slab mold so as to partly fill a mold space of the slab mold that is at least 6 feet long by at least 3 feet wide. The process may also include moving the partly filled slab mold relative to the first stencil so that a second stencil is positioned over the partly filled slab mold, and the second stencil may define a second pattern of second design apertures surrounded by second occluded regions. The process may further include outputting a second particulate mineral mix of the set of different particulate mineral mixes from a second distributor and through the second design apertures of the second stencil. Also, the process may include depositing the second particulate mineral mix passing through the second design apertures into the slab mold and into regions of the mold space of the slab mold that are unoccupied by the first pigmented particulate mineral mix. Further, the process may include vibrating and compacting (which are optionally performed contemporaneously) the pigmented particulate mineral mixes arranged in the slab mold so as to form a synthetic molded slab that is generally rectangular and has major surface with a width or at least 3 feet and a length of at least 6 feet. Additional embodiments described herein include a synthetic molded slab formed according to this particular process.

In one aspect of this process, the first particulate mineral mix and the second particulate mineral mix may comprise at least two differently colored mineral mixes that each include the quartz material, one or more pigments, and at least one binder. In second aspect of this process, the depositing of the first particulate mineral mix may include distributing the first particulate mineral mix according to a first predefined pattern, and the depositing the second particulate mineral mix may include distributing the second particulate mineral mix according to a second predefined pattern. In a third aspect of this process, the first predefined pattern may define a first pigmented vein, and the second predefined pattern may define a second pigmented vein of the slab. In a fourth aspect of this process, at least a portion of the first pigmented vein may surround at least a portion of the second pigmented vein. In a fifth aspect, the process may further include polishing the major surface of the slab. In a sixth aspect, the process provides the slab in a manner that emulates the appearance of a quarried stone slab due at least in part to the two differently colored mineral mixes distributed according to the first predefined pattern and the second predefined pattern. In a seventh aspect of this process, the depositing the first particulate mineral mix may include depositing the first particulate mineral mix into the slab mold according to a first predefined and repeatable pattern, and the depositing the second particulate mineral mix may include depositing the second particulate mineral mix into the slab mold according to a second predefined and repeatable pattern so as to define complementary regions of multiple different particulate mineral mixes.

Further embodiments described herein include a system for forming a synthetic molded slab using a combination of different particulate mineral mixes. The system may include at least one slab mold defining a mold space that is at least 6 feet long by at least 3 feet wide. Also, the system may include two or more stencils defining complementary patterns of open spaces and occluded spaces, and the cumulative areas of the open spaces of the stencils corresponding to substantially the mold space of the particular slab mold. The system may further include two or more mineral aggregate distributors that are each configured to dispense a corresponding particulate mineral mix into the slab mold through a corresponding one of the stencils. Each stencil may be configured to prevent a mix in the distributor from accessing selected areas of each mold in the series of molds.

Some embodiments described herein include a set of separately molded synthetic slabs having a substantially repeated rectangular major surface appearance defined by a set of particulate mineral mixes. Each respective slab of the set may include at least two different particulate mineral mixes distributed according to at least two predefined stencil patterns for each of the synthetic slabs in the set of separately molded synthetic slabs. A first mix of the at least two different particulate mineral mixes occupies a full thickness each respective slab at first regions in which a second mix of the at least two different particulate mineral mixes is absent, and the second mix of the at least two different particulate mineral mixes occupies the full thickness of each respective slab at second regions in which the first mix of the at least two different particulate mineral mixes is absent. Optionally, the at least two different particulate mineral mixes may each comprise a quartz material, one or more pigments, and one or more resin binders. Also, each respective slab is rectangular and has major surface with a width or at least 3 feet and a length of at least 6 feet.

Particular embodiments described herein include a synthetic molded slab that optionally comprises at least a quartz material. The synthetic molded slab may include a major surface defined by a set of particulate mineral mixes and having a rectangular shape that is at least 2 feet wide by at least 6 feet long and extending perpendicularly to a slab thickness. The major surface may have at least a first pigmented vein pattern defined by a first stencil pattern and a second pigmented vein pattern defined by a second stencil pattern that is a negative of the first stencil pattern. The first pigmented vein pattern may include a first particulate mineral mix that occupies the slab thickness at a set of first regions that collectively provide the first pigmented vein pattern, and the second pigmented vein pattern may include a second particulate mineral mixes that occupies the slab thickness at a set of second regions that collectively provide the second pigmented vein pattern. The first particulate mineral mix may be absent from the set of second regions, and the second particulate mineral mix may be absent from the set of first regions. The first and second particulate mineral mixes may be differently pigmented, and each of the particulate mineral mixes may optionally comporise the quartz material, one or more pigments, and one or more binders.

The systems and techniques described here may provide one or more of the following advantages. First, a system can be used to produce a plurality of synthetic molded slabs that each have similar striations and veining patterns and that are suitable for use in living or working spaces (e.g., along a countertop, table, floor, or the like). Such slabs can be formed from a combination of differently pigmented particulate mineral mixes that are vertically distributed into designated regions of each mold according to predefined and complementary dispensation patterns (e.g., two or more horizontally oriented templates that can be positioned over each mold), which provide the selected striations and veining patterns that are generally repeatable for each separately molded slab.

Second, each slab in the system can be formed from a compression molding operation in which the molds containing the particulate mineral mixes are maintained in a horizontal orientation after the mold is filled. For example, the differently pigmented particulate mineral mixes are vertically poured through a series of complementary, horizontally oriented templates, the filled mold is shifted horizontally for a subsequent compression molding operation (e.g., vibro-compaction molding, curing, etc.). From there, some or all of the mold is removed from the hardened slab so that at least a major surface of the slab is polished to provide an appearance of the complex striations and veining patterns that emulate a quarried stone slab. In such circumstances, the polished major surface of each of the synthetic molded slabs provides an outer appearance that is remarkably similar to the other slabs in the set of separately molded slabs, unlike quarried stone slabs taken from a quarry. Moreover, the pigments and particulate mineral mixes can be selected to provide color combinations and visual effects that improved upon and offer a variety of color combination options far beyond what is available from quarried stone slabs taken from a quarry.

The details of one or more implementations are set forth in the accompanying drawings and the description below. Other features and advantages will be apparent from the description and drawings, and from the claims.

DESCRIPTION OF DRAWINGS

FIG. 1 is a perspective view of a synthetic molded slab after formation, in accordance with some embodiments.

DETAILED DESCRIPTION

Figure 2A:
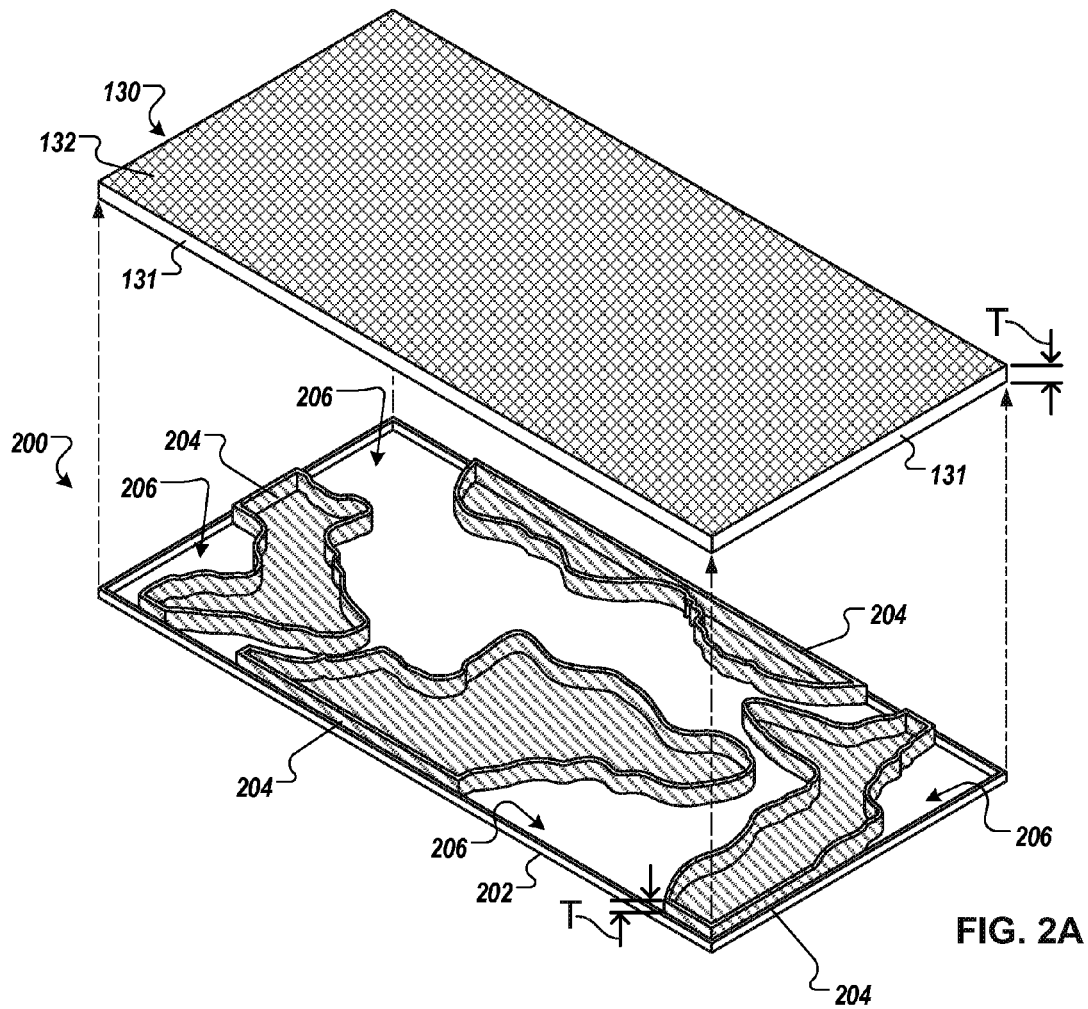
FIGS. 2A and 2B are exploded and assembled views of an example of a first partial slab stencil aligned with a slab mold, in accordance with some embodiments.

Referring to FIG. 1, a system can be used to produce one or more synthetic molded slabs 50 having a number of striations or veins according to a predefined pattern. Each slab 50 can comprise a quartz material and/or other particulate mineral material that, when mixed with pigments and a resin binder and compressed, provides a hardened slab product suitable for use in living or working spaces (e.g., along a countertop, table, floor, or the like). As shown in FIG. 1, each slab 50 can be formed from a combination of differently pigmented particulate mineral mixes that are vertically poured into different, designated regions of a respective mold (while the mold is horizontally oriented in this embodiment). These designated regions are repeated for each mold in a series of molds (described in more detail below) due to, for example, a set of stencil structures that can be positioned over each mold and that provide a predefined complementary and repeatable dispensation pattern for the differently pigmented particulate mineral mixes in each mold. In some embodiments described herein, the predefined complementary and repeatable dispensation pattern for the differently pigmented particulate mineral mixes provides the selected striations and veining patterns that are generally repeatable for each separately molded slab. As will be discussed in further detail in the descriptions of FIGS. 2A-7, some embodiments described herein employ a first partial stencil is arranged above a horizontal slab mold, and a first pigmented particulate mix is dispensed though open portions of the stencil into the mold. One or more successive stencils (e.g., at least a second partial stencil) are positioned over the same mold that is partially filled with the first pigmented particulate mix in predefined regions, and one or more differently pigmented particulate mixes (e.g., at least a second pigmented particulate mix) are sequentially dispensed through open portions of the successive stencils into the mold until all regions of the mold are filled. The mold may be subsequently transported in the horizontal orientation for compaction, curing, and other operations.

As shown in FIG. 1, depending upon the predefined dispensation pattern of the complementary partial stencils, the dispensation process can provide an aesthetic effect that emulates the veined appearance of natural quarried stone slabs such as granite or marble, including some veins 51 and 52 that extend partly or fully across a complete length L of the hardened slab 50 (e.g., at least 3 feet wide by at least 6 feet long, and between about 3 feet and 6 feet wide and between about 6 feet and 12 feet long, between about 4.5 feet and 5.5 feet wide and between about 10 feet and 11 feet long, and preferably a size selected from one of about 4.5 feet wide by about 10 feet long or about 5.5 feet wide by about 11 feet long). Not only can such differently pigmented veins 51 and 52 extend across the full length of the slab product, but such veins 51 and 52 can also extend through the thickness of the slab 50 (thereby providing a natural vein appearance even when the slab is cut and edged to specific shapes in living or working spaces (e.g., along a countertop, table, floor, or the like). Because each slab 50 in the set of separately molded slabs can include the layers of different particulate mineral mixes dispensed into the mold according to the predefined and repeatable dispensation patterns of complementary stencils, multiple slabs 50 in the set of separately molded slabs can have substantially the same appearance to one another.

In this embodiment depicted in FIG. 1, the slab 50 comprises two different particulate mineral mixes that are separately dispensed into the mold 130 through two complementary stencils (e.g., a first stencil that is essentially a negative of a second stencil). However, in some embodiments, three or more stencils may be used to repeatably pattern the distribution of three or more different particulate mineral mixes that are separately dispensed into the mold 130. The different mixes dispensed into each mold according to the repeatable pattern can be compaction molded and cured in the mold (described in more detail below) so as to provide the hardened slab 50 of composite stone material. One or more of the mixes that are used to form the composite stone material can include organic polymer(s) and inorganic (mineral) particulate component. The inorganic (mineral) particulate component may include such components as silicon, basalt, glass, diamond, rocks, pebbles, shells, a variety of quartz containing materials, such as, for example, but not limited to: crushed quartz, sand, quartz particles, and the like, or any combination thereof. In this embodiment, all of the different particulate mineral mixes each comprise a quartz material as a predominant component, which may include sand of various particle sizes and of different combinations. In the hardened slab 50, the organic and inorganic materials can be linked using a binder, which may include for example, mono-functional or multifunctional silane molecules, dendrimeric molecules, and the like, that may have the ability to bind the organic and inorganic components of the composite stone mix. The binders may further include a mixture of various components, such as initiators, hardeners, catalysators, binding molecules and bridges, or any combination thereof. Some or all of the mixes dispensed in the mold may include components that are combined in a mixing apparatus (not shown) prior to being conveyed to the mold. The mixing apparatus can be used to blend raw material (such as the quartz material, organic polymers, unsaturated polymers, and the like) at various ratios. For example, some or all of the mixes dispensed in the mold may include about 8-95% quartz aggregates to about 5-15% polymer resins. In addition, various additives, may be added to the raw materials in the mixing apparatus, such additives may include, metallic pieces (e.g., copper flecks or the like), colorants, dyes, pigments, chemical reagents, antimicrobial substances, fungicidal agents, and the like, or any combination thereof.

Preferably, the mold at least partially defines a length L and a width W of the hardened slab 50 (because the mold retains the particulate mineral mixes therein throughout the subsequent compaction and curing processes). In some embodiments, the width W of the slab 50 formed in the mold is at least 3 feet, between about 3 feet and 6 feet, and preferably about either 4.5 feet, and the length L of the slab 50 formed in the mold is at least 6 feet, and between about 6 feet and 12 feet, preferably about 10 feet. In some implementations, the mold may be sized to form larger (e.g., "jumbo") slabs, where the width W of the slab 50 formed in the mold is about 5 feet to about 6 feet (e.g., preferably about 5.5 feet) and the length L of the slab 50 formed in the mold is about 10.5 feet to about 12 feet (e.g., preferably about 11 feet). As such, even though each slab 50 can be relatively large in length L, some or all of the veins 51, 52 can nevertheless extend across the full length of the slab 50. In some embodiments, the thickness T of the slab 50 formed is at least 1 inch, between about 1 inch and 5 inches, and preferably about 3 inches.

Figure 2B:
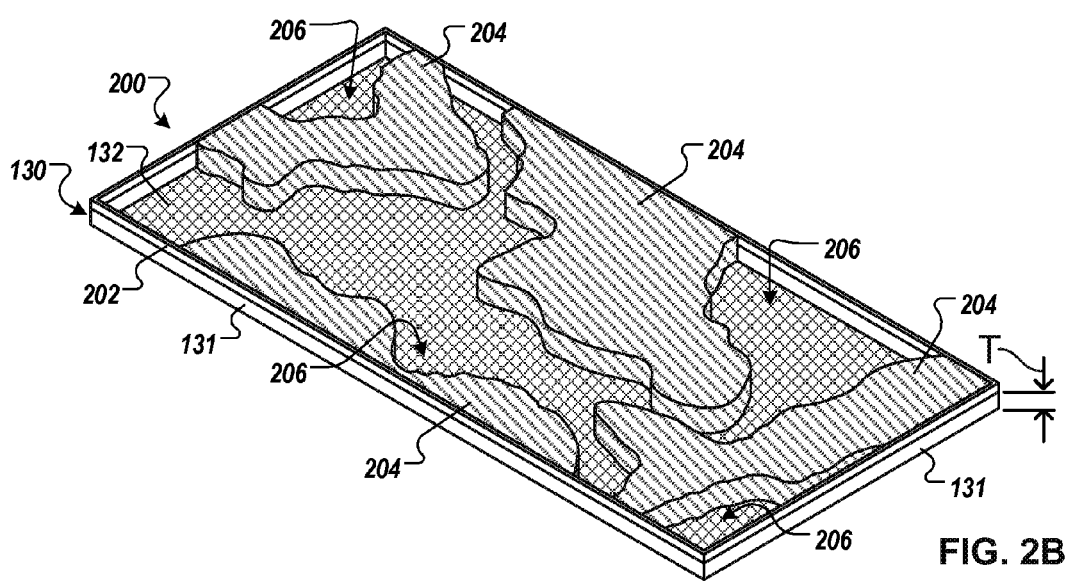

Referring now to FIGS. 2A and 2B, exploded and assembled views of an example of a first partial slab stencil 200. Referring to FIG. 2A, a slab mold 130 and the partial slab stencil 200 are shown in an exploded and inverted view. The slab mold 130 includes a planar mold floor 132 bounded by a collection of mold walls 131 extending perpendicular from the planar mold floor, defining a generally tray-like shape.

The partial slab stencil 200 includes an outer frame 202 having a length and width that approximates that of the slab mold 130. In some embodiments, the slab mold 130 can be at least 3 feet, between about 3 feet and 5 feet, and preferably about 4 feet, and the length L of the slab 50 formed in the mold is at least 6 feet, and between about 6 feet and 10 feet, preferably about 8 feet. In some implementations, the slab mold may be sized to form larger (e.g., "jumbo") slabs, where the width W of the slab 50 formed in the mold is at least 5 feet (e.g., about 5.5 ft) and the length L of the slab 50 formed in the mold is at least 10 feet (e.g., about 11 ft). In some embodiments, the slab mold 130 can have a thickness T of at least 1 inch, between about 1 inch and 5 inches, and preferably about 3 inches.

The outer frame 202 that supports a collection of occluded regions 204 and defines a collection of design apertures 206. The outer frame 202 and/or the occluded regions 204 can be formed from metal (e.g., steel, aluminum), plastic, wood, composite (e.g., fiberglass, carbon fiber), rubber, or combinations of these and/or any other appropriate material. In some embodiments, the outer frame 202 and/or the occluded regions 204 can include non-stick materials or coatings that can resist adhesion with the ingredients of particulate mineral mixes.

The occluded regions 204 extend beyond the outer frame 202 a distance approximately equal to the thickness T of the slab mold 103. When the partial slab stencil 200 is assembled with the slab mold 130, as shown in FIG. 2B, the outer frame 202 rests upon the mold walls 131 of the slab mold 130, and the occluded regions 204 extend substantially through the thickness T of the slab mold 130 to contact the planar mold floor 132. As will be discussed further in the descriptions of FIGS. 4-7, when the partial slab stencil 200 is assembled with the slab mold 130, the design apertures 206 define spaces within the slab mold into which a particulate mineral mix can be dispensed, while the occluded regions 204 prevent the mix from entering.

Figure 3A:
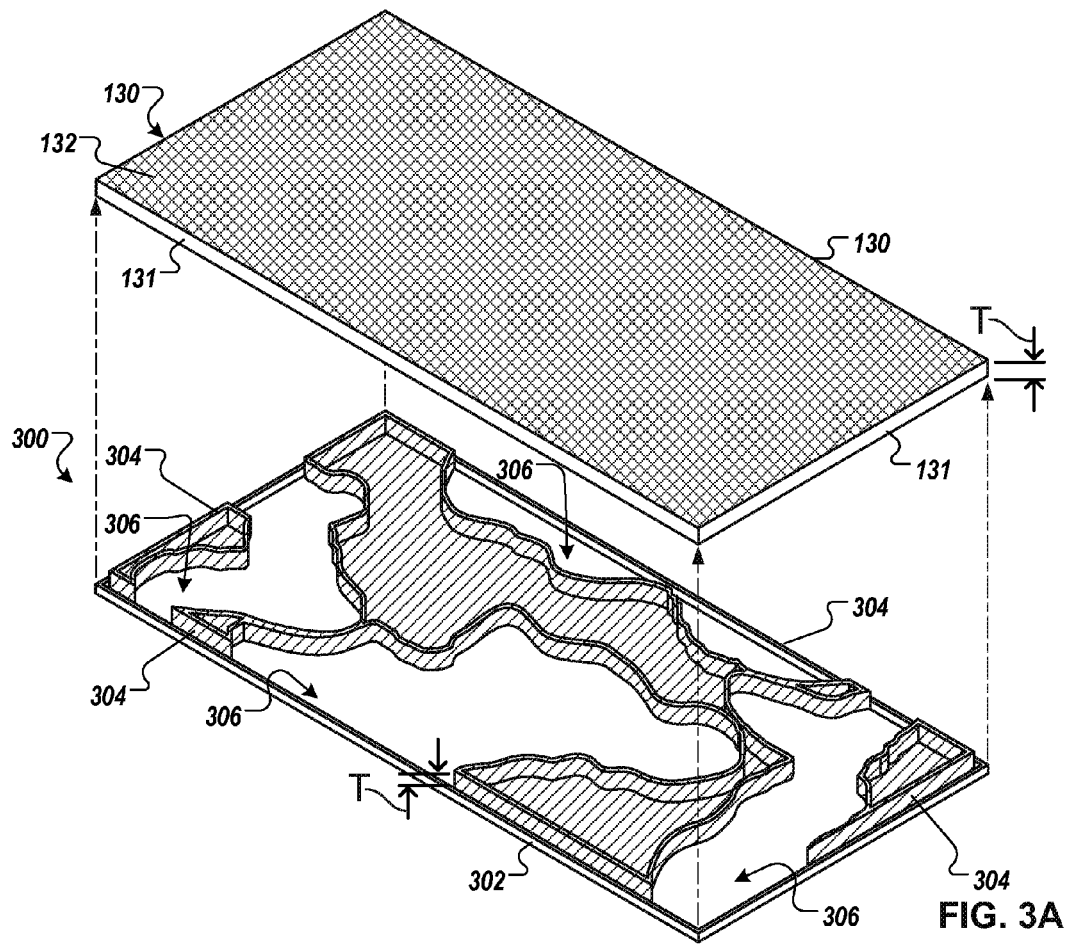
FIGS. 3A and 3B are exploded and assembled views of an example of a second partial slab stencil that is complementary to the first partial slab stencil of FIGS. 2A and 2B, the second partial slab stencil being aligned with the slab mold of FIGS. 2A and 2B.
Figure 3B:
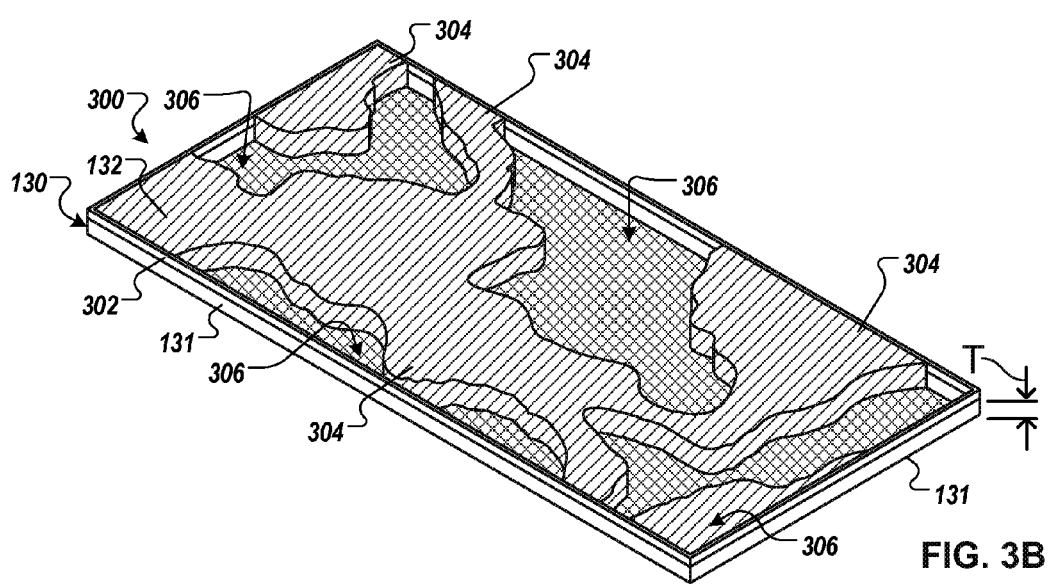

Referring now to FIGS. 3A and 3B, exploded and assembled views of an example of a second partial slab stencil 300. Referring to FIG. 3A, the same slab mold 130 (previously depicted in FIGS. 2A and 2B) and the second partial slab stencil 300 are shown in an exploded and inverted view. Generally speaking, in this embodiment, the second partial slab stencil 300 is complementary to the first partial slab stencil 200 (FIGS. 2A and 2B). For example, areas that are occluded in the first partial slab stencil 200 are generally open in the second partial slab stencil 300, and areas that are open in the first partial slab stencil 200 are generally occluded in the second partial slab stencil 300. In some embodiments, the first partial slab mold 200 may define a "positive" pattern while the second partial slab stencil 300 defines a "negative" pattern that corresponds inversely to the "positive" pattern.

The second partial slab stencil 300 includes an outer frame 302 having a length and width that approximates that of the slab mold 130. The outer frame 302 that supports a collection of occluded regions 304 and defines a collection of design apertures 306. The outer frame 302 and/or the occluded regions 304 can be formed from metal (e.g., steel, aluminum), plastic, wood, composite (e.g., fiberglass, carbon fiber), rubber, or combinations of these and/or any other appropriate material. In some embodiments, the outer frame 302 and/or the occluded regions 304 can include non-stick materials or coatings that can resist adhesion with the ingredients of particulate mineral mixes.

The occluded regions 304 extend beyond the outer frame 302 a distance approximately equal to the thickness T of the slab mold 103. When the second partial slab stencil 300 is assembled with the slab mold 130, as shown in FIG. 3B, the outer frame 302 rests upon the mold walls 131 of the slab mold 130, and the occluded regions 304 extend substantially through the thickness T of the slab mold 130 to contact the planar mold floor 132. As will be discussed further in the descriptions of FIGS. 4-7, when the second partial slab stencil 300 is assembled with the slab mold 130, the design apertures 306 define spaces within the slab mold 130 into which a particulate mineral mix can be dispensed, while the occluded regions 304 prevent the mix from entering. In some embodiments, three or more partial slab stencils with design apertures that cumulatively correspond substantially to the length and width of the slab mold can be used (for sequentially dispensing a corresponding number of differently pigmented particulate mixes).

Figure 4:
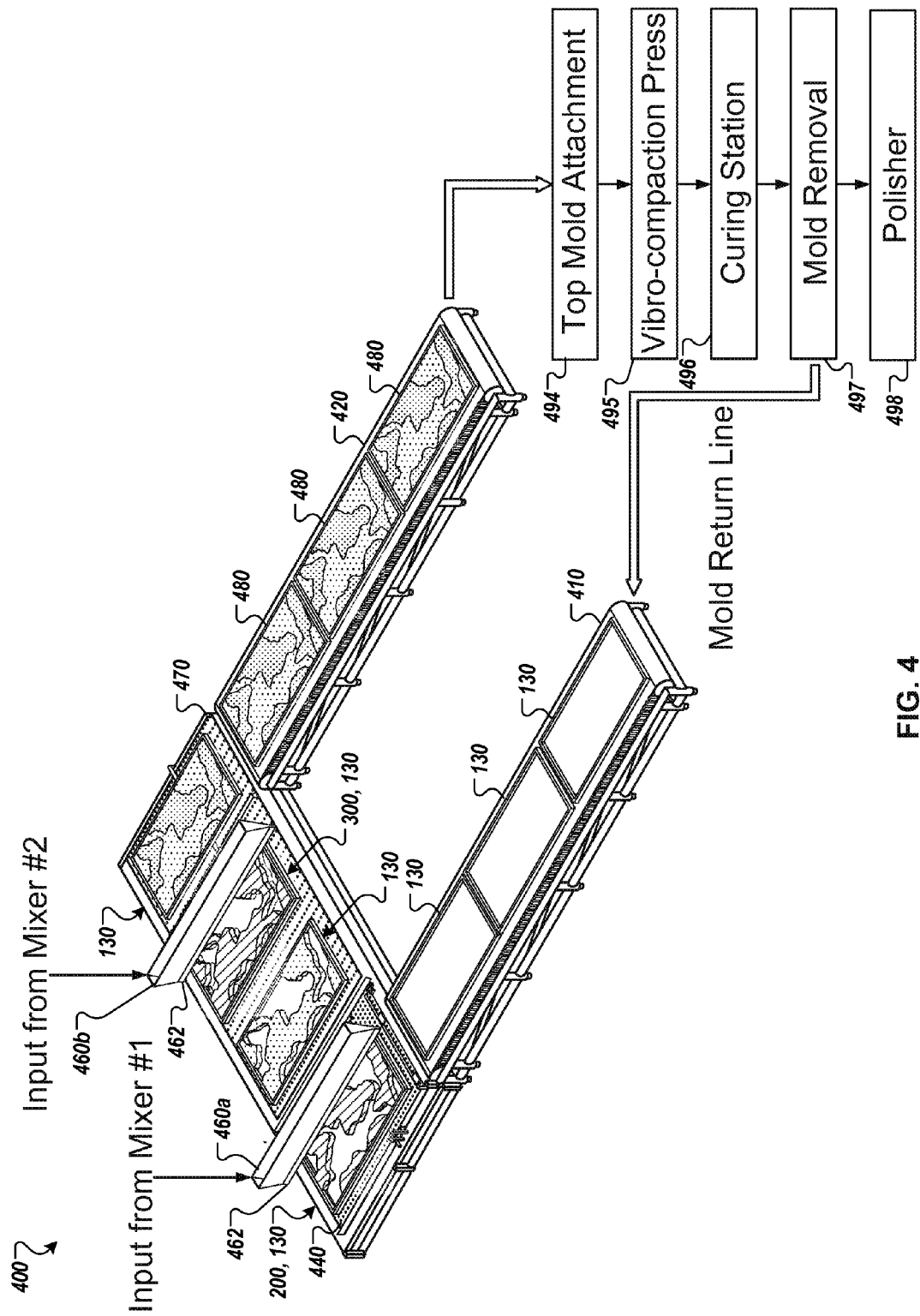
FIG. 4 is a diagram of an example system for forming a synthetic molded slab product.

Referring now to FIG. 4, in some embodiments, a system 400 for forming a set of synthetic molded slab products (e.g., the slab 50 in FIG. 1) is configured to sequentially dispense differently pigmented particulate mineral mixes through two or more complementary partial slab stencils and into the same horizontally oriented mold, which is then processed using a subsequent compression molding operation (e.g., vibro-compaction molding, curing, etc.). The system 400 in the depicted embodiment includes an input conveyor 410 and an output conveyor 420. A collection of slab molds 130 are transported on the input conveyor 410. The slab molds 130 provide a form for synthetic molded slab products that are at least three feet wide and at least six feet long. The input conveyor 410 transports the slab molds 130 to an air table 440. The air table 440 includes a collection of outlets formed on a top surface. Air pumped through the outlets forms a cushion of air between the top surface and the slab molds 130, to help operators move and/or orient the slab molds 130.

Still referring to FIG. 4, the system 400 also includes a collection of mineral aggregate distributors 460a, 460b. In this embodiment, each of the distributors 460a, 406b is dedicated to dispensing a corresponding particulate mineral mix (refer to FIG. 1). In this embodiment, the partial slab stencil 200 is temporarily assembled to the slab mold 130. The slab mold 130 is moved horizontally (e.g., relative to gravity) beneath the distributor 460a, partly filling the slab mold 130 with a first particulate mineral mix. The partial slab stencil 200 is disassembled from the slab mold 130, and the partial slab stencil 300 is temporarily assembled to the partly filled slab mold 130. The slab mold 130 is moved horizontally (e.g., relative to gravity) beneath the distributor 460b, partly filling the slab mold 130 (e.g., the complementary areas left unfilled by the partial slab stencil 200) with a second particulate mineral mix. Additional details of this particular embodiment of the partial slab stencils 200, 300 are described further in connection with FIGS. 5A-7.

For example, in this embodiment, the first and second partial slab stencils 200, 300 are configured to receive two differently pigmented mineral mixes (comprising mostly a quartz material as described above), so there are two corresponding distributors 460a, 406b. In this embodiment, each of the mineral aggregate distributors 460a, 460b includes a dispensing head 462. In use, the dispensing heads 462 each receive a corresponding particulate mineral mix from a different mixer line (not shown), such that each dispenser head 462 is configured to release a different particulate mineral mix (e.g., different pigments, different mineral compositions, different additives, or a combination thereof) compared to the other dispenser heads 462. Each dispenser head 462 is configured to controllably dispense its supply of corresponding particulate mineral mix through the apertures 206, 306 of a corresponding one of the partial slab stencils 200, 300. For example, the dispensing heads 462 are each configured with a shutter or valve apparatus (not shown) that is controllable to regulate the flow of particulate mineral mix from the dispensing head 462 to the slab mold 130. The dispensing heads 462 are controllable dispense fillers into the slab molds 130 at a substantially repeatable rate. Additional details of this particular embodiment of the dispensing head 462 are described further in connection with FIGS. 5A-6B.

In the illustrated example, two mineral aggregate distributors 460a, 406b and two partial slab stencils 200, 300 are used, although in other examples, the slab may be formed from between 2 and 20 different particulate mineral mixes, and more preferably between 3 and 8 different particulate mineral mixes (thereby providing a system that would include a corresponding number of distributors and partial slab stencils). In some examples, the number of mineral aggregate distributors and partial slab stencils can correspond equally to the number of differently pigmented particulate mineral mixes used to create the hardened slab product.

After the slab mold 130 has been sufficiently filled, the partial slab stencil 300 is disassembled from the slab mold 130. The slab mold 130 (now a filled mold 480) is moved on a cushion of air provided by an air table 470, to an output conveyor 120. As shown in FIG. 1, the successive complementary patterns of different particulate mineral mixes that were dispensed into the mold 130 are generally noticeable in the filled molds 480 and are arranged in the horizontal orientation on the output conveyor 420. Some or all of these successive complementary patterns of different particulate mineral mixes can form the repeatably patterned veins of the hardened slab (e.g., the slab 50 in FIG. 1, the slab 600 in FIG. 6, or the like).

Optionally, the system 400 may include a secondary dispenser (not shown), which may be positioned so that each filled mold 480 passes under the secondary dispenser. The secondary dispenser can be configured to dispense a material that is used to define one more generally "widthwise" veins. Optionally, these widthwise veins may be thinner and spread further apart than the veins defined by the successive complementary patterns of different particulate mineral mixes. Also, these widthwise veins may be formed from a material having a different pigmentation than the particulate mineral mixes dispensed from the distributors 460a, 460b. In some embodiments, the secondary dispenser may be configured with a shutter or valve apparatus (not shown) that is controllable to regulate the flow of pigmented material, thereby providing a predetermined pattern of the widthwise veins that is repeatable for each of the filled molds 480 pass under the secondary dispenser. In some embodiments, the secondary dispenser can be configured to dispense a pigment powder material (e.g., not mixed with quartz material). In other embodiments, the secondary dispenser can be configured to dispense a particulate mineral mix (including a quartz material) having pigments that are different from the mixes dispensed from the distributors 460a, 460b. In some embodiments, the pigment powder material (or other material) dispensed from the secondary dispenser can be deposited along a major (exposed) side of the filled mold 480 so that at least a portion of the material penetrates at least slightly into the thickness of the mineral mix material previously poured into the mold 480 (thereby permitting the widthwise veins to remain viewable even after compaction and polishing of the slab). In such circumstances, the widthwise veins may not extend through the full thickness of the hardened slab (which is different from some or all of the veins defined by the successive complementary patterns of different particulate mineral mixes poured into the mold 130 by the distributors 460a, 460b).

Still referring to FIG. 4, the output conveyor 420 can be configured to transport each of the filled molds 480 to one or more sequent stations in the system 400 for forming the hardened slab. For example, each of the filled molds 480 can continue to a subsequent station in which a top mold attachment 494 is positioned over the filled mold 480 so as to encase the layers of particular mineral mixes between the mold 130 and a top cover mold piece (not shown in FIG. 4). From there, the filled mold 480 (now including the top cover mold piece continues to a subsequent station in which a vibro-compaction press 495 applies compaction pressure, vibration, and vacuum to the contents inside the filled mold 480, thereby converting the particulate mixes into a rigid slab. After the vibro-compaction operation, the filled mold 480 (with the compacted and hardened slab therein) proceeds to a curing station 496 in which the material used to form the slab (including any resin binder material) are cured via a heating process, thereby further strengthening the slab inside the filled mold 480. After the slab is fully cured (and cooled), the primary mold 130 and the top mold cover piece are removed from the hardened and cured slab at a mold removal station 497. The primary mold 130 is then returned to the input conveyor 410. Then, the hardened and cured slab is moved to a polisher station 498, in which a major surface of the slab is polished to a smooth finish, thereby an appearance of the complex striations and veining patterns that emulate a quarried stone slab. In such circumstances, the polished major surface of each of the synthetic molded slabs provides an outer appearance that is generally repeatable for to the other slabs (from the other filled molds 480 in FIG. 4).

Figure 5A:
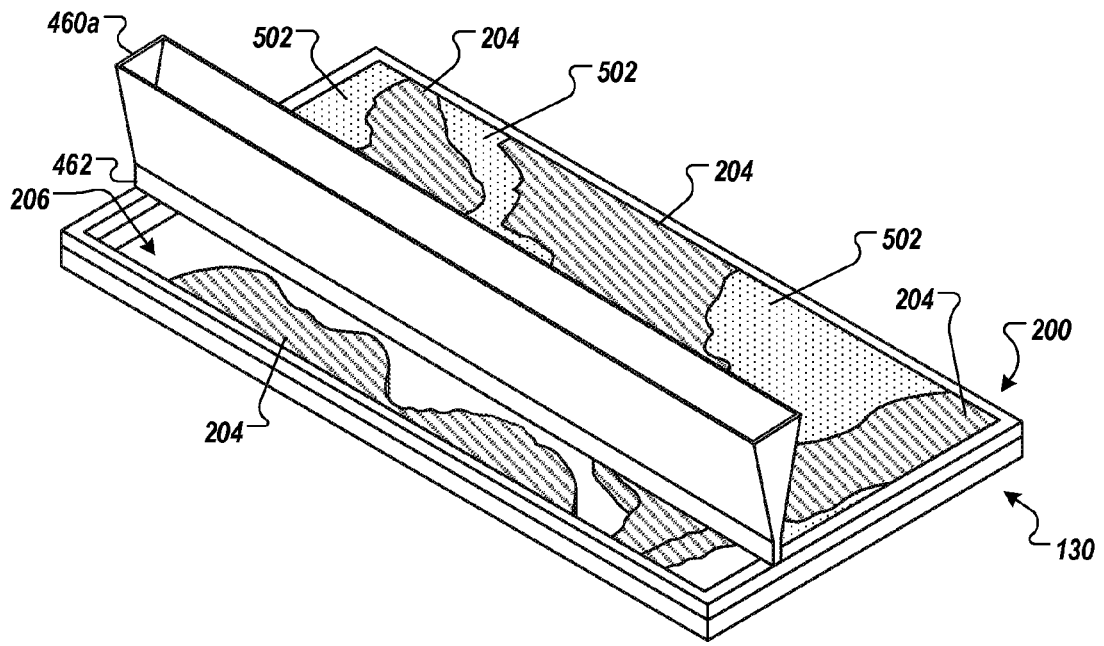
FIGS. 5A-5D are diagrams of a synthetic molded slab during and after filling of two partial slab stencils.

Now referring to FIG. 5A, the slab mold 130 is shown with the partial slab stencil 200. The slab mold 130 is partly filled by drawing the distributor 460a laterally across the partial slab stencil 200, or by passing the partial slab stencil and the slab mold 130 laterally beneath the distributor 460a. The distributor 460a holds a first particulate mineral mix, which is controllably released though the dispensing head 462 into the slab mold 130. The collection of occluded regions 204 block the dispensation of the mix into predetermined areas of the slab mold 130, while the collection of apertures 206 allow the mix to fill predetermined areas of the slab mold 130, shown as a collection of filled regions 502.

Figure 5B:
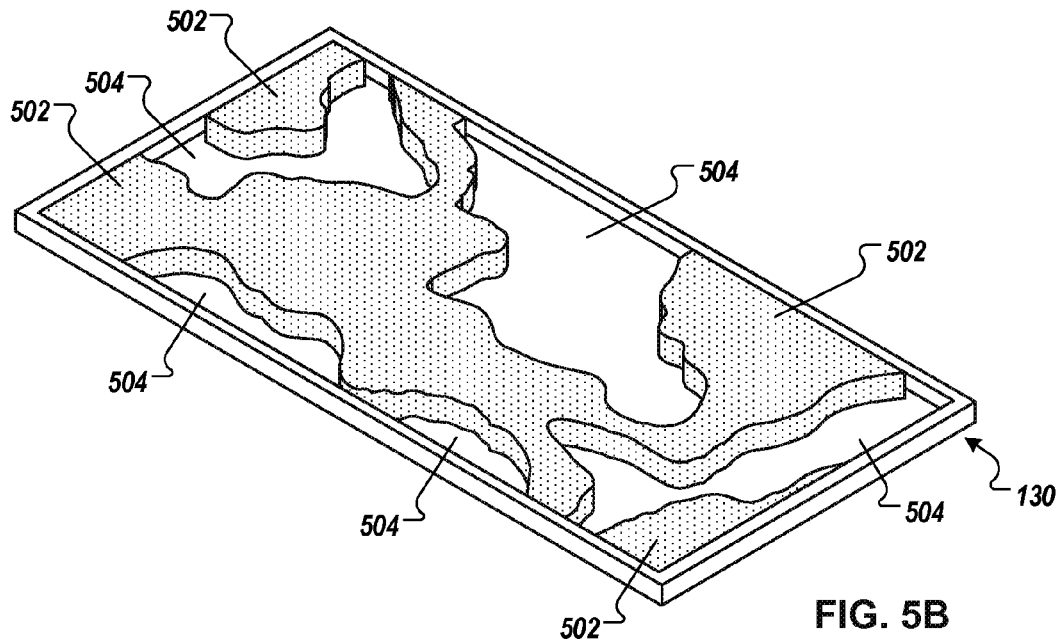

Referring now to FIG. 5B, the slab mold 130 is shown with the partial slab stencil 200 removed after being partly filled according to the pattern provided by the partial slab stencil 200. As a result, the slab mold 130 is partly filled with the first particulate mineral mix in the filled regions 502, and is partly unfilled in a collection of unfilled areas 504.

Figure 5C:
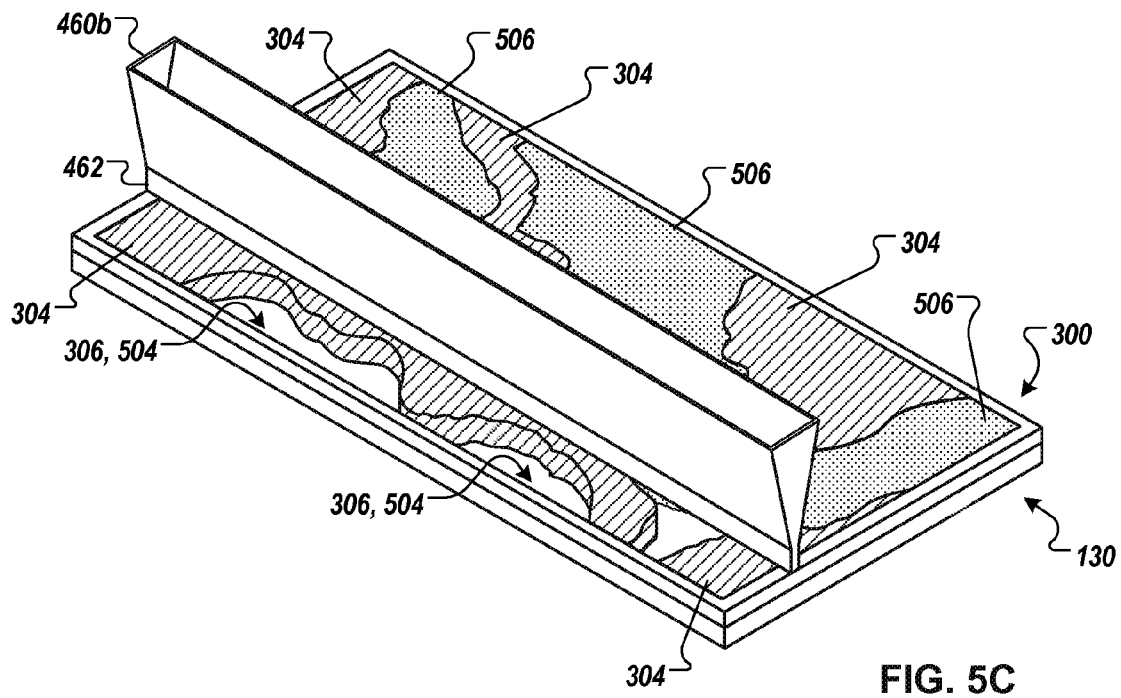

Now referring to FIG. 5C, the slab mold 130 is shown with the partial slab stencil 300. The collection of occluded regions 304 substantially correspond to the collection of filled regions 502 (not visible in this view) and substantially prevent the second mix from being dispensed as a second layer upon the first mix already in the filled regions 502. Conversely, the collection of apertures 302 substantially correspond to the collection of unfilled areas 504 left by the partial slab stencil 200. For example the partial slab stencil 300 has a pattern that is the negative of the pattern of the partial slab stencil 200, and the collective combination of the apertures 202 and 302 substantially correspond to the area (e.g., length L and width W) of the slab mold 130.

The slab mold 130 is partly filled by drawing the distributor 460b laterally across the partial slab stencil 300, or by passing the partial slab stencil and the slab mold 130 laterally beneath the distributor 460b. The distributor 460b holds a second particulate mineral mix, which is controllably released though the dispensing head 462 into the slab mold 130. The collection of occluded regions 304 block the dispensation of the mix into predetermined areas of the slab mold 130, while the collection of apertures 306 allow the mix to fill the unfilled areas 504 of the slab mold 130, shown as a collection of filled regions 506.

Figure 5D:
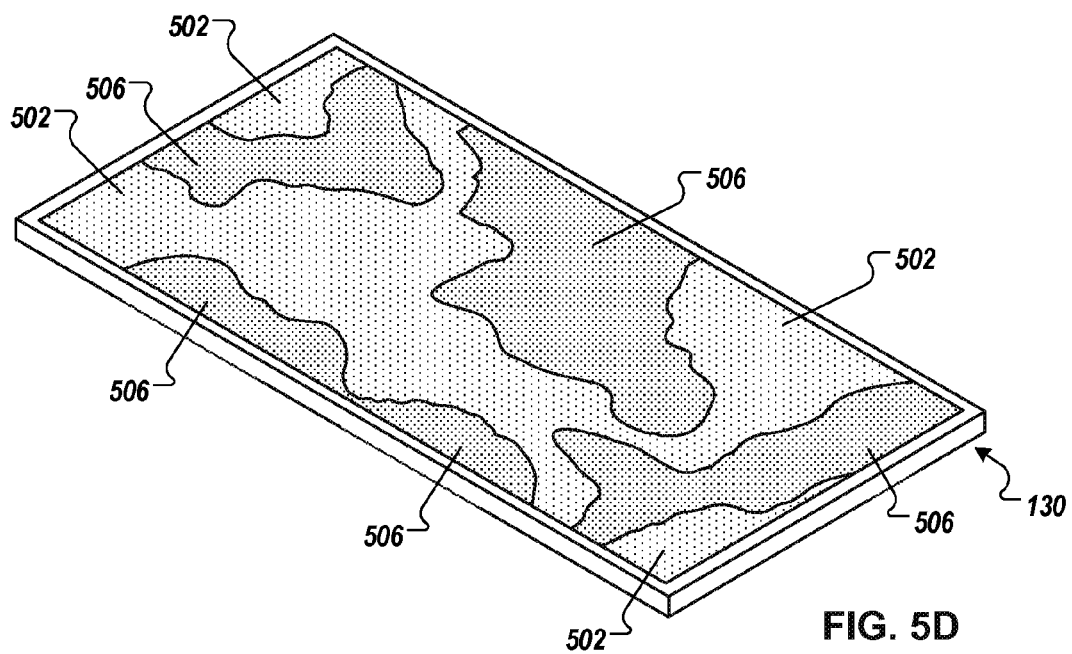

Referring now to FIG. 5D, the slab mold 130 is shown with the partial slab stencil 300 removed after being partly filled according to the pattern provided by the partial slab stencil 300. As a result, the slab mold 130 is partly filled with the first particulate mineral mix in the filled regions 502, and is partly filled with the second particulate mineral mix in the filled regions 506.

In some embodiments, three or more partial slab stencils, distributors, and particulate mineral mixes can be used. For example, four partial slab stencils can be used in which each partial slab stencil has a predetermined pattern of apertures that do not overlap those of the other stencils, and collectively combine to substantially correspond to the area of the slab mold 130. Four different particulate mineral mixes (e.g., with different aesthetic qualities) can be dispensed into the four collections of apertures to create a four-color composite slab with a pattern that can be substantially repeated for multiple slabs.

Figure 6:
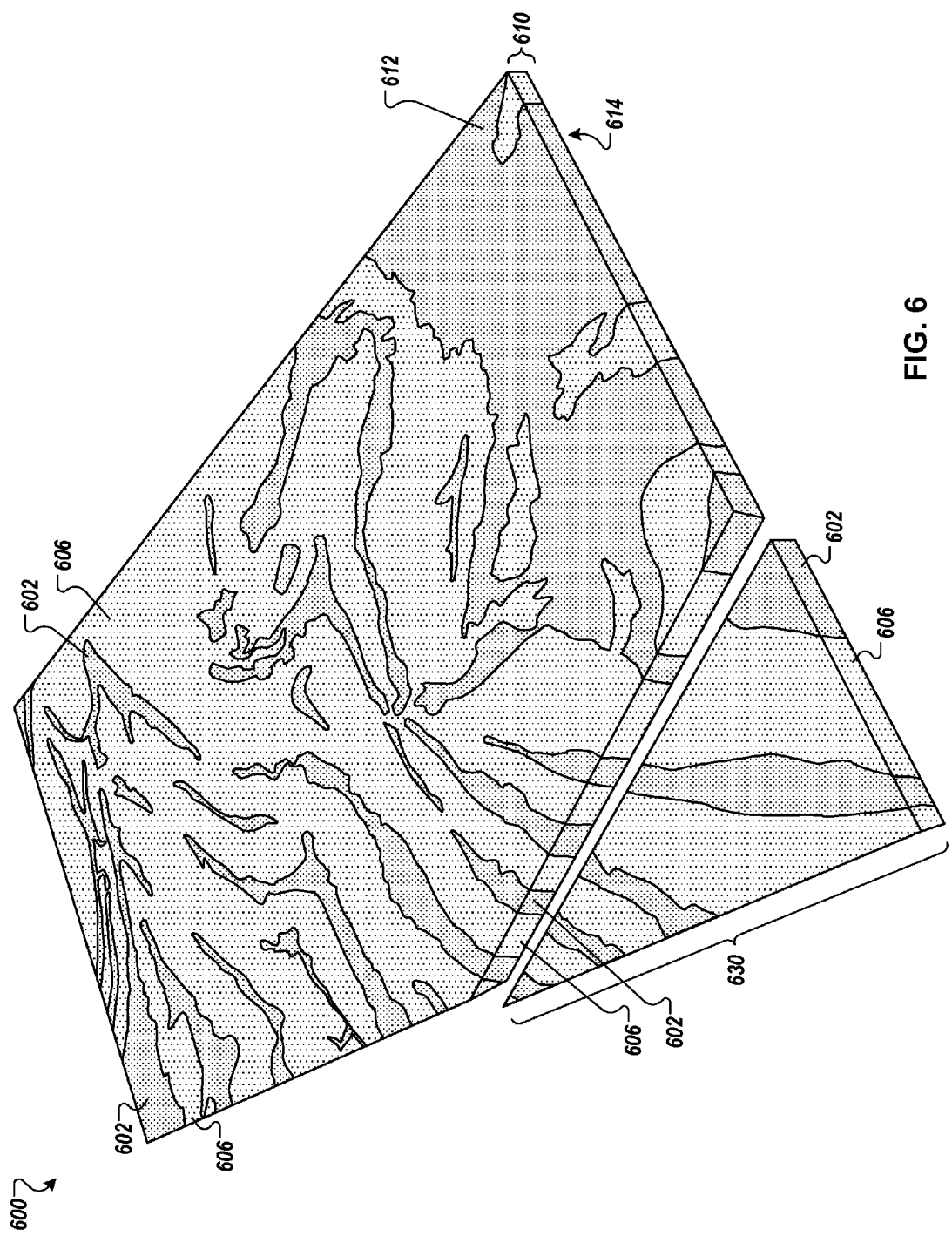
FIG. 6 is a perspective view of an example synthetic molded slab product formed by the system of FIG. 4.

Referring now to FIG. 6, an example synthetic molded slab product 600 can be formed by the system of FIG. 4 using a combination of differently pigmented particulate mineral mixes that are distributed according to predefined patterns of the two (or more) complementary partial slab templates 200 and 300 into the mold 130. In some embodiments, the synthetic molded slab product 600 can provide a veined appearance that emulates quarried stone slabs such as granite or marble, depending upon the predefined dispensation pattern of the different particular mixes. For example, the major surface 612 of the slab 600 can be polished and provide at least some veins 602, 606 that extend partly or fully across a length and/or width of the hardened slab 600. Not only can such differently pigmented veins (602 and 606, for example) extend across the slab product, but such veins can also extend through the thickness 610 of the slab 600 from the first major face 612 to the opposing major face 614 (thereby providing a natural vein appearance even when the slab is cut and edged to specific shapes in living or working spaces (e.g., along a countertop, table, floor, or the like). Optionally, at least the major surface 612 of the slab 600 may include a plurality of secondary veins (not shown) defined, for example, by a secondary dispenser. Some of these "secondary" veins can extend fully across a complete width of the hardened slab 600. Because each slab 600 in the set of separately molded slabs (refer, for example, to the system in FIG. 4) can include the regions of different particulate mineral mixes dispensed into the mold 130 according to the predefined and repeatable dispensation patterns of the partial slab stencils, multiple slabs 600 in the set can have similarly positioned veins in the major surface and can provide substantially the same appearance to one another.

The synthetic molded slab 600 can be cut, milled, machined, or otherwise processed to various shapes and sized (e.g., to provide custom-fit countertop surfaces with optional holes for sinks, faucets, or other amenities). For example, a section 630 is cut away from the synthetic molded slab product 600. With the veins 602 and 606 extending into the interior 606 and/or across the thickness 610, cutting and/or processing of the synthetic molded slab product 600 shows the veins 602 and 606 in a manner that emulates the aesthetics of cut quarried stone slabs.

Figure 7:
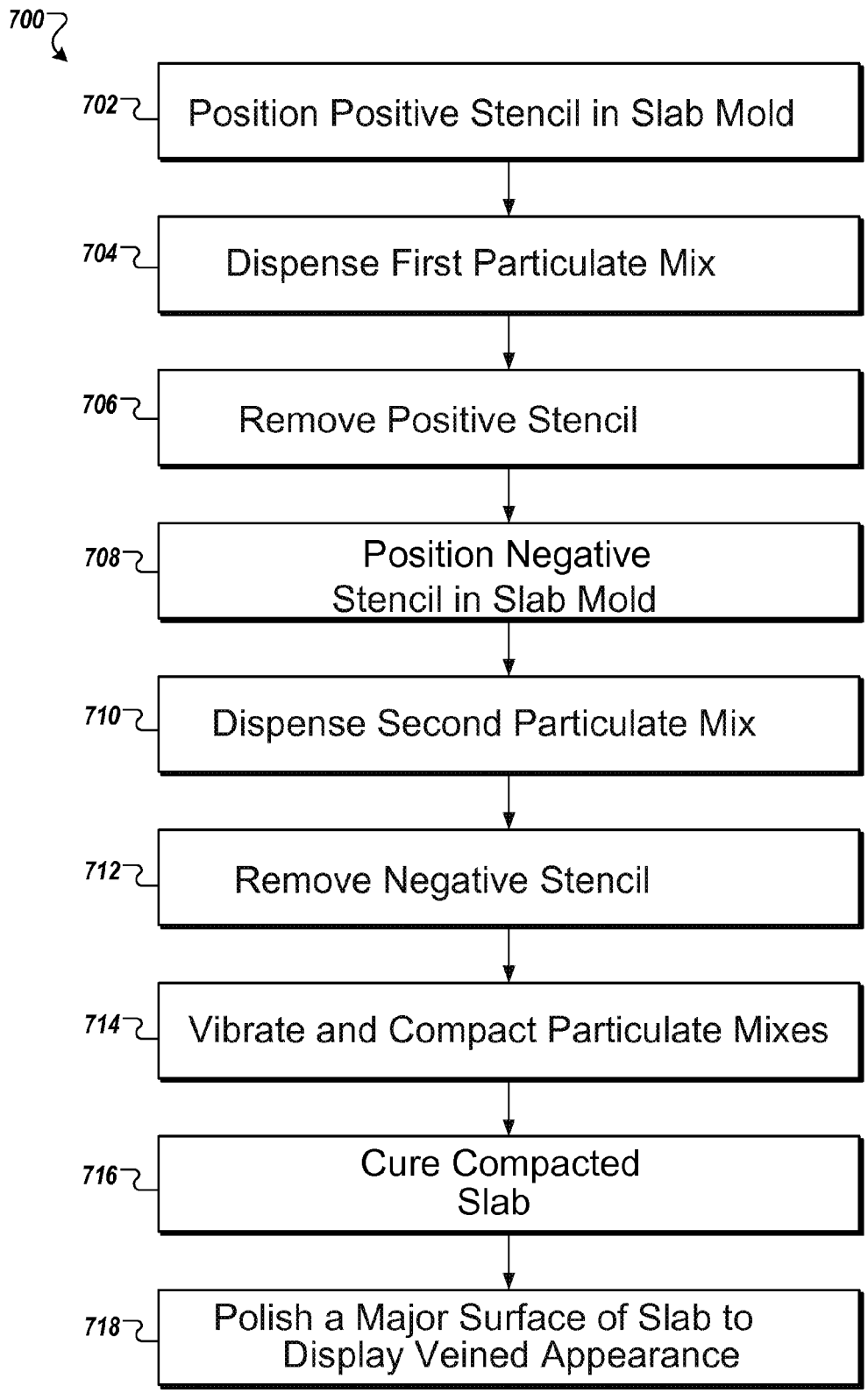
FIG. 7 is a flow diagram of an example process for forming a synthetic molded slab product.

FIG. 7 is a flow diagram of an example process 700 for forming a synthetic molded slab product (such as slab 50 or 600 described above). In some implementations, the system 400 of FIG. 4 can be used to perform the process 700. The process 700 may include the operation 702 of positioning a positive partial slab stencil in a slab mold. In such an operation, a partial slab stencil, such as the partial slab stencil 200 may be temporarily assembled to the slab mold 130. The process 700 may also include the operation 704 of dispensing a first particulate mineral mix through the positive stencil into the slab mold. For example, as previously described, a first pigmented mix comprising predominantly a quartz material (e.g., a mix including the particulate quartz material, one or more pigments, and one or more resin binders) can be fed into the slab mold 130 using the distributor 460a (FIG. 4). Next, the process 700 may include the operation 706 of removing the positive partial slab stencil, and may include the operation 708 of positioning a negative partial slab stencil in a slab mold. In such operations, the partial slab stencil 200 may be removed, and the partial slab stencil 300 may be temporarily assembled to the slab mold 130.

The process 700 may also include the operation 710 of dispensing a second particulate mineral mix through the negative stencil into the slab mold. For example, as previously described, a second pigmented mix comprising predominantly a quartz material (e.g., a mix including the particulate quartz material, one or more pigments, and one or more resin binders) can be fed into the slab mold 130 using the distributor 460b (FIG. 4). Next, the process 700 may include the operation 712 of removing the positive partial slab stencil. For example, the partial slab stencil 300 can be removed from the slab mold 130.

The process 700 may further include the operation 714 of contemporaneously vibrating and compacting the particulate mineral mixes arranged in the mold while the mold is in the horizontal orientation. In such circumstances, the operation 714 may provide a compacted slab of composite stone material. Also, in some embodiments, the process 700 may further include the operation 716 of curing the compacted slab. The process 700 may also include the operation 718 of polishing a major surface of the slab to provide a veined appearance on the polished surface of the slab, including but not limited to the examples described above.

Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A set of separately molded synthetic slabs having generally the same rectangular major surface appearance defined by a same set of particulate mineral mixes, each respective slab of the set comprising at least two different particulate mineral mixes positioned relative to one another according to at least two predefined stencil patterns for each of the synthetic slabs in the set of separately molded synthetic slabs, wherein a first mix of the at least two different particulate mineral mixes occupies a full thickness of each respective slab at first regions in which a second mix of the at least two different particulate mineral mixes is absent, and the second mix of the at least two different particulate mineral mixes occupies the full thickness of each respective slab at second regions in which the first mix of the at least two different particulate mineral mixes is absent, the at least two different particulate mineral mixes each comprising a quartz material, one or more pigments, and one or more resin binders, wherein each respective slab is rectangular and has a major surface with a width of at least 3 feet and a length of at least 6 feet.

2. The set of separately molded synthetic slabs of claim 1, wherein the at least two predefined stencil patterns comprises at least a first predefined pattern that defines a first pigmented vein and a second predefined pattern that defines a second pigmented vein of each of the synthetic slabs in the set of separately molded synthetic slabs.

3. The set of separately molded synthetic slabs of claim 2, wherein at least a portion of the first pigmented vein at least partly surrounds at least a portion of the second pigmented vein.

4. The set of separately molded synthetic slabs of claim 1, wherein the substantially repeated rectangular major surface is polished.

5. The set of separately molded synthetic slabs of claim 1, wherein the substantially repeated rectangular major surface appearance emulates the appearance of a quarried stone slab due at least in part to the different particulate mineral mixes distributed according to at least the two predefined stencil patterns.

6. The set of separately molded synthetic slabs of claim 1, wherein the at least two predefined stencil patterns having a predefined and repeatable pattern so as to define complementary regions of the at least two different particulate mineral mixes.

7. The set of separately molded synthetic slabs of claim 2, wherein the first pigmented vein extends across the full length of the major surface of each respective slab.

8. The set of separately molded synthetic slabs of claim 7, wherein the major surface has a size selected from one of: about 4.5 feet wide by about 10 feet long, or about 5.5 feet wide by about 11 feet long.

9. The set of separately molded synthetic slabs of claim 1, wherein the resin binder comprises a silane.

10. The set of separately molded synthetic slabs of claim 1, wherein the resin binder comprises dendrimeric molecules.

11. The set of separately molded synthetic slabs of claim 1, wherein the first mix comprises between 5% and 15% polymer resins.

12. The set of separately molded synthetic slabs of claim 1, further comprising a third particulate mineral mix that is differently pigmented as compared to the first and second particulate mineral mixes.

13. The set of separately molded synthetic slabs of claim 12, wherein the third particulate mineral mix forms a vein that does not extend through the full thickness of each respective slab.

14. A set of separately molded synthetic slabs having generally the same rectangular major surface appearance defined by a same set of particulate mineral mixes, each respective slab of the set comprising at least two different particulate mineral mixes positioned relative to one another according to at least two predefined stencil patterns for each of the synthetic slabs in the set of separately molded synthetic slabs, wherein a first mix of the at least two different particulate mineral mixes occupies a full thickness of each respective slab at first regions in which a second mix of the at least two different particulate mineral mixes is absent, and the second mix of the at least two different particulate mineral mixes occupies the full thickness of each respective slab at second regions in which the first mix of the at least two different particulate mineral mixes is absent, the at least two different particulate mineral mixes each comprising a quartz material, one or more pigments, and one or more resin binders, wherein each respective slab is rectangular and has a major surface with a width of at least 3 feet and a length of at least 6 feet; wherein the third particulate mineral mix forms a vein that extends across a full width of the major surface.

15. The set of separately molded synthetic slabs of claim 14, wherein the third particulate mineral mix forms a vein that does not extend through the full thickness of each respective slab.

16. The set of separately molded synthetic slabs of claim 15, wherein the first pigmented vein extends across the full length of the major surface of each respective slab.

* * * * *